United States Patent [19]
Antonevich

[11] 4,071,179
[45] Jan. 31, 1978

[54] APPARATUS AND METHODS FOR FLUXLESS SOLDERING

[75] Inventor: John N. Antonevich, Jamestown, N.Y.

[73] Assignee: Blackstone Corporation, Jamestown, N.Y.

[21] Appl. No.: 627,761

[22] Filed: Oct. 31, 1975

[51] Int. Cl.² ............................................. B23K 3/06
[52] U.S. Cl. .................................. 228/1 A; 228/56; 228/1 B
[58] Field of Search ................ 228/1 A, 1 B, 56, 262; 118/429; 68/3 SS; 259/DIG. 41, DIG. 44

[56] References Cited
U.S. PATENT DOCUMENTS

| | | | |
|---|---|---|---|
| 3,056,589 | 10/1962 | Daniel | 68/3 SS |
| 3,562,041 | 2/1971 | Robertson | 228/1 B X |
| 3,822,820 | 7/1974 | Brouwer et al. | 228/1 A |
| 3,833,163 | 9/1974 | Denslow et al. | 228/1 A |

Primary Examiner—Al Lawrence Smith
Assistant Examiner—K. J. Ramsey
Attorney, Agent, or Firm—Buell, Blenko & Ziesenheim

[57] ABSTRACT

A solder pot is provided in the form of an elongated pot for containing molten solder, at least one elongate coupling member extending longitudinally of said vessel and fixed on the outside thereof in energy transfer relationship therewith, a multiplicity of vibratory transducers equally spaced along said coupling member and affixed thereto, a power generator and oscillator connected commonly to all said transducers and means for uniformly heating the vessel and metal therein.

6 Claims, 4 Drawing Figures

APPARATUS AND METHODS FOR FLUXLESS SOLDERING

This invention relates to apparatus and methods for fluxless soldering and particularly to apparatus and methods for soldering capillary joints by use of cavitation phenomenon.

The fluxless method of soldering or coating parts with molten metal using the cavitation phenomenon of melts induced by high amplitude alternating pressure changes is well known. Solder pots commonly used for practicing such fluxless soldering or coating are limited in their ability to generate cavitation sites which are uniformly distributed without recourse to zone control of energy distribution. Typical of this practice is that illustrated and described in U.S. Pat. No. 3,822,820, issued July 9, 1974 to the Aluminum Company of America. Essentially the apparatus there provided has the source of vibrating energy to the solder pot made up of an array of individual transducers coupled to a solder pot through coupling members isolating the transducers from the high temperatures located at the pot and arranged in several zones. Unfortunately, however, this arrangement like all similar arrangements known to me leads to gross variation of resonance or energy transmission between individual coupling members and transducer assemblies due to the difficulty of fabricating identical transducers and coupling members and in connecting them to the solder pot at prescribed locations having like mechanical impedances. In order to compensate for transducers, coupling member and connection variations, it is common, in present practice, to resort to multiple generators and/or frequency oscillators to vary power or frequency in an effort to optimize energy distribution and cavitation within the solder in the pot.

I have discovered a solder pot design which eliminates or minimizes the design, fabrication and assembly problems of conventional vibratory solder pots and provides a solder pot which can be operated with a common power source eliminating the need for zone power or frequency control and eliminating the need for multiple generators or frequency oscillators. The apparatus of this invention eliminates the gross variations in resonance or energy transmission which characterizes prior art devices and the problems of attempting to compensate for multiple individual transducers, coupling members and mechanical connections.

I provide a vessel for containing molten metal at elevated temperatures, at least one elongate coupling member extending longitudinally of said vessel on the outside thereof, a multiplicity of transducers affixed to said elongate coupling member and in sonic energy transfer relationship therewith a power generator and oscillator connected commonly to said transducers and means for uniformly heating the vessel and molten metal therein. Preferably, the vessel is contoured and fitted with a plurality of coupling members so that the planes of the coupling members intersect on or above the center line of the molten metal bath surface. Preferably, the pot has a half octagon cross section transverse to its length. Preferably, the transducers connected to a single coupling member are connected by common power and ground electrodes. Preferably, the transducer masses are a high refractory material such as titanium, titanium alloys, ceramics, pyrex glass, or the like. Preferably, the transducers are of the piezoelectric type, providing ultrasonic energy (18 to 60 KHZ).

In the foregoing general description I have set out certain objects, purposes and advantages of my invention. Other objects, purposes and advantages of this invention will be apparent from a consideration of the following description and the accompanying drawings in which.

Figure 1:
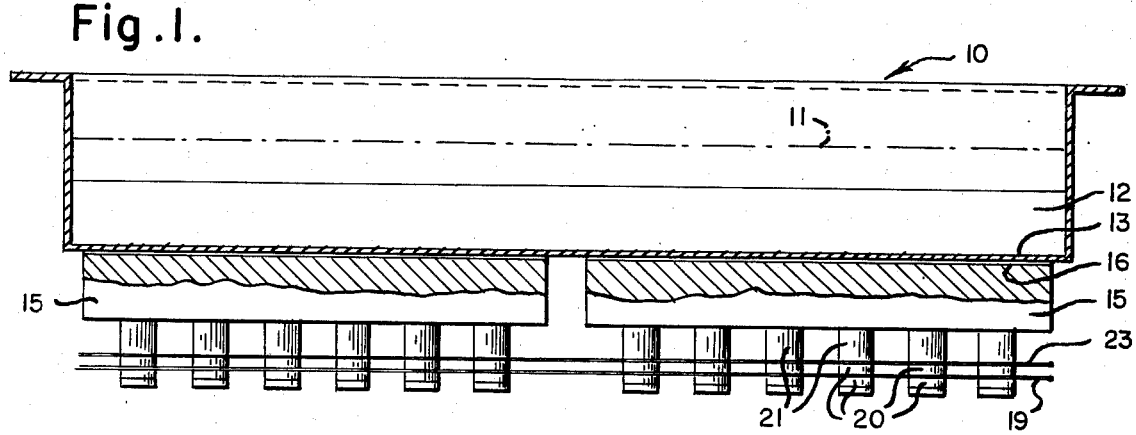
FIG. 1 is a longitudinal cross section through a solder pot according to my invention.
Figure 2:
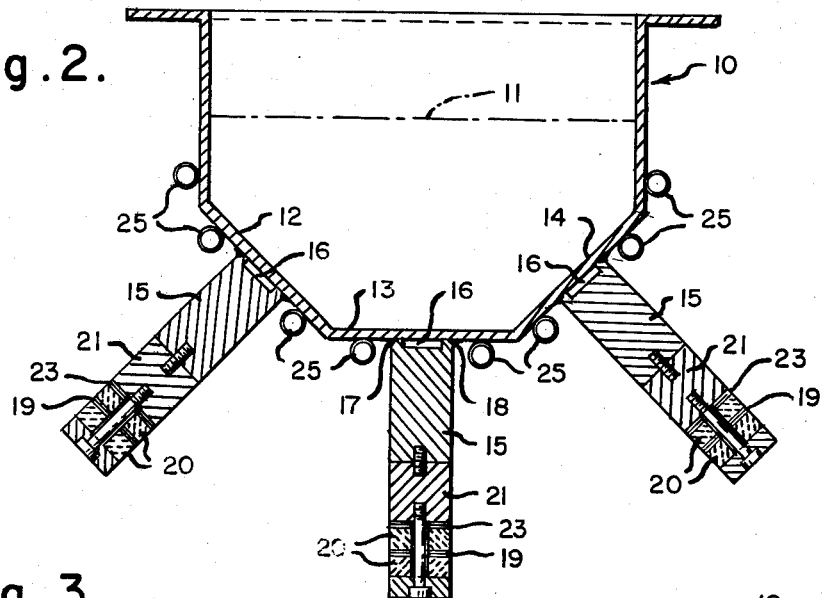
FIG. 2 is a transverse cross section on the line II—II of FIG. 1.
Figure 3:
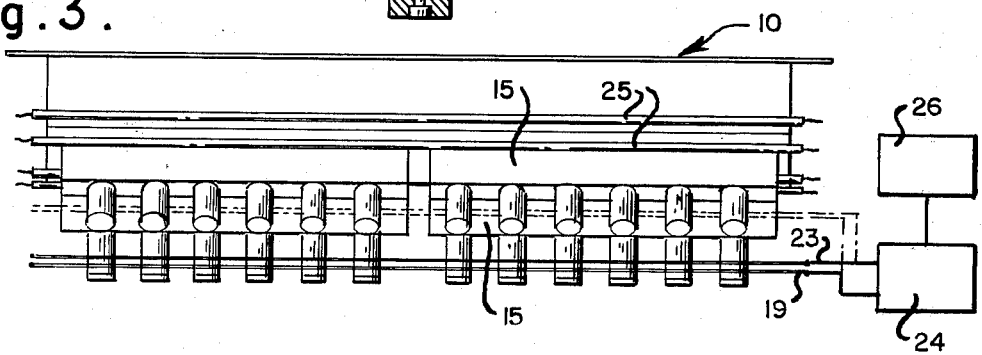
FIG. 3 is a side elevation of the solder pot of FIGS. 1 and 2.

Referring to the drawings I have illustrated a solder pot 10 having a molten bath of solder 11 contained therein. The pot 10 is preferably of half octagonal cross section having bottom faces 12, 13 and 14 each having an elongated single coupling member 15 running lengthwise of its centerline. Each coupling member has a lengthwise recess 16 milled therein so as to provide two parallel spaced contact surfaces 17 and 18 which are welded to the bottom faces of the pot. This minimizes the fabrication and operating difficulties for the pot and assures uniformity of coupling integrity between the coupling member and pot. A common power electrode 19 made up of two thin gauge high mechanical endurance limit sheets of metal is sandwiched between piezoelectric elements 20 which are in turn sandwiched between masses 21 and 22. A common ground 23 also made up of two thin gauge high mechanical endurance limit sheets of metal is sandwiched between one of the piezoelectric members 20 and mass 21. A conventional generator 24 and oscillator 26 are provided connected to said power electrode 19 and ground 23. Heating elements 25 are provided on the exterior of the pot to heat the pot and solder to maintain the solder in molten condition.

Figure 4:
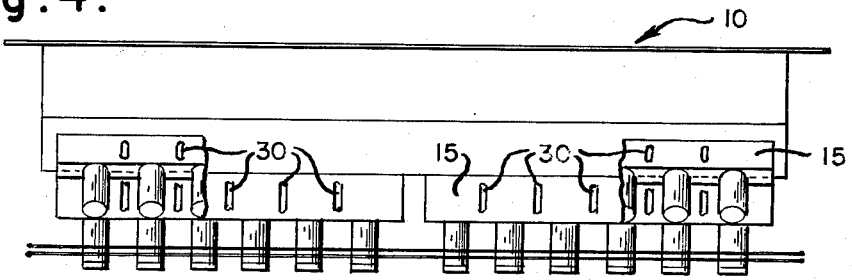
FIG. 4 is a second embodiment of pot arrayed for cross mode coupling.

This invention operates best when common coupling arrays of transducers are assembled with less than a quarter wave spacing between them, however, the invention is operative in cross mode coupling where the length of the array is resonant at a chosen frequency and the common coupling member is provided with spaced openings or windows 30 as illustrated in FIG. 4.

In the foregoing specification I have set out certain preferred embodiments and practices of my invention, however, this invention may be otherwise embodied within the scope of the following claims.

I claim:

1. A solder pot comprising in combination an elongated pot for containing molten solder, the cross section of said pot transverse to its length being in the form of a generally half octagon having two vertical sides, a flat bottom and two sloping sidewalls connecting the vertical sides and bottom at least one elongate coupling member extending longitudinally of said vessel on each of said bottom and sloping sidewalls and fixed on the outside thereof in energy transfer relation therewith, a multiplicity of vibratory transducers equally spaced along said coupling member and affixed thereto, a power generator and oscillator connected commonly to all said transducers for energizing the same and means for uniformly heating the vessel and metal therein, each of said coupling member having a lengthwise central recess along its top edge bordered by parallel spaced contact surfaces in contact with the vessel wall and attached to said wall.

2. A solder pot comprising in combination an elongated pot for containing molten solder, the cross section of said pot transverse to its length being in the form of a generally half octagon having two vertical sides, a flat bottom and two sloping sidewalls connecting the vertical sides and bottom, at least one elongate coupling member extending longitudinally of said vessel on each of said bottom and sloping sidewalls and fixed on the outside thereof in energy transfer relation therewith, a multiplicity of vibratory transducers equally spaced along each of said coupling members and affixed thereto, a power generator and oscillator connected commonly to all said transducers for energizing the same and means for uniformly heating the vessel and metal therein, the transducers of a single coupling member being connected together by a common power lead and a common ground lead, said power leads and ground leads being connected to a common power generator and oscillator, and said power lead and ground lead each being formed of two thin gauge high mechanical endurance metal sheets.

3. A solder pot as claimed in claim 2 having a coupling member attached to each of its non-vertical faces along the center line.

4. A solder pot as claimed in claim 1 wherein the transducers are piezoelectric elements.

5. A solder pot as claimed in claim 1 having a plurality of coupling members whose planes intersect along a line at or above substantially the center line of the top of the molten solder bath.

6. A solder pot as claimed in claim 1 wherein the transducers are ultrasonic transducers of the range 18 to 60 KHZ.

* * * * *